Figure 1:
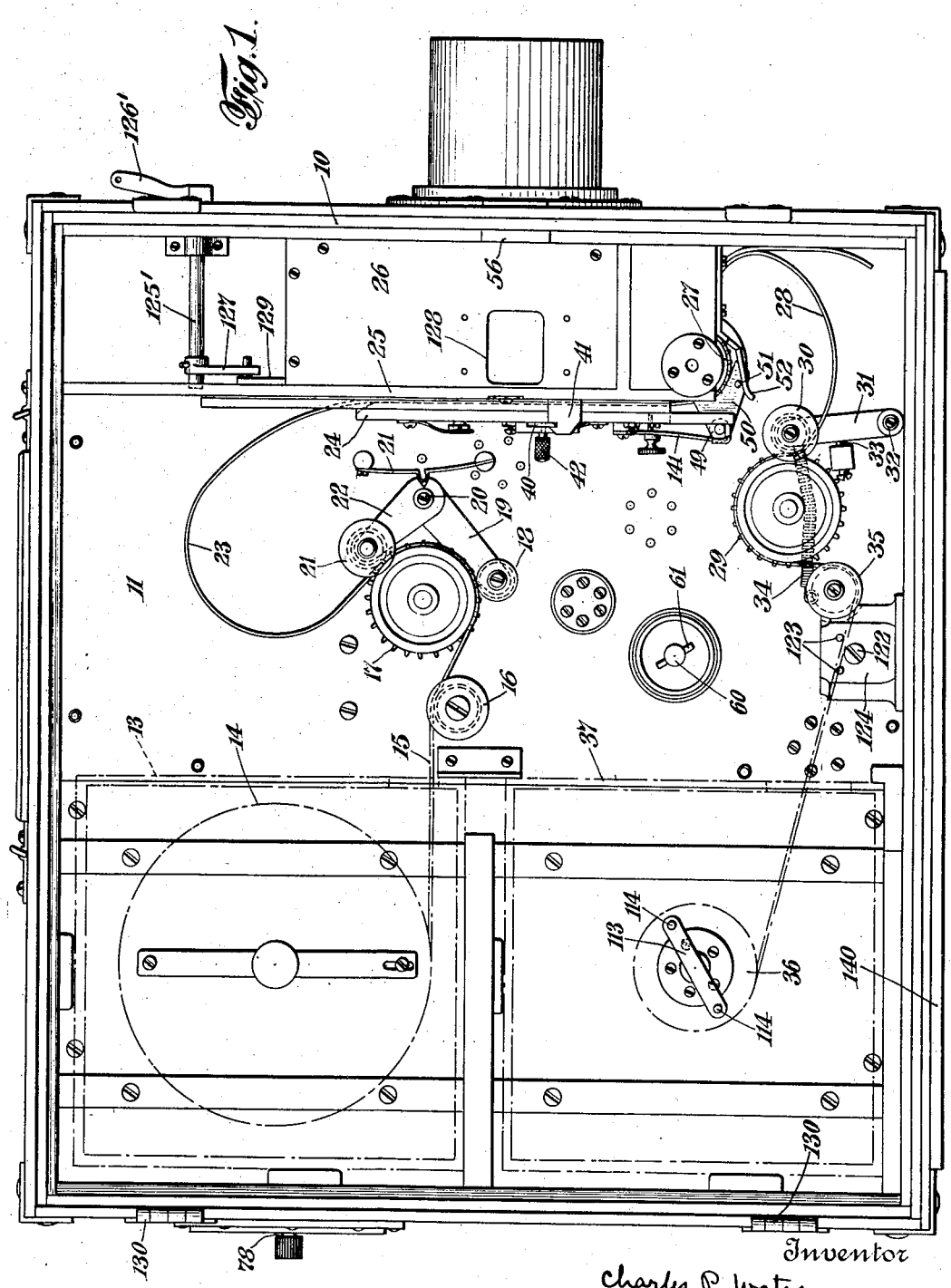

Jan. 12, 1926. 1,569,103
C. P. WATSON
MOVING PICTURE CAMERA
Filed May 13, 1920 3 Sheets-Sheet 1

Inventor
Charles P. Watson
By his Attorney
Gorham Crosby

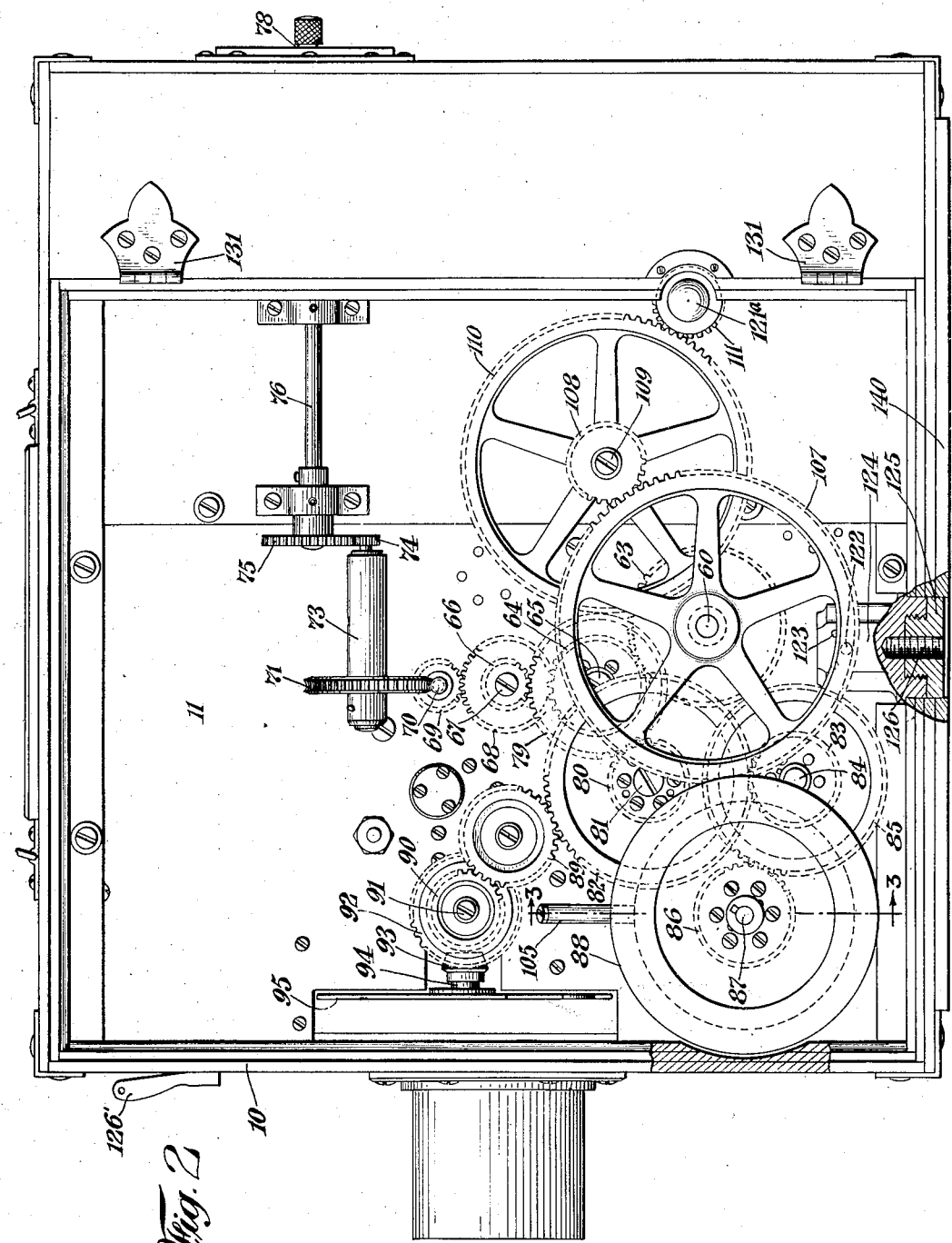

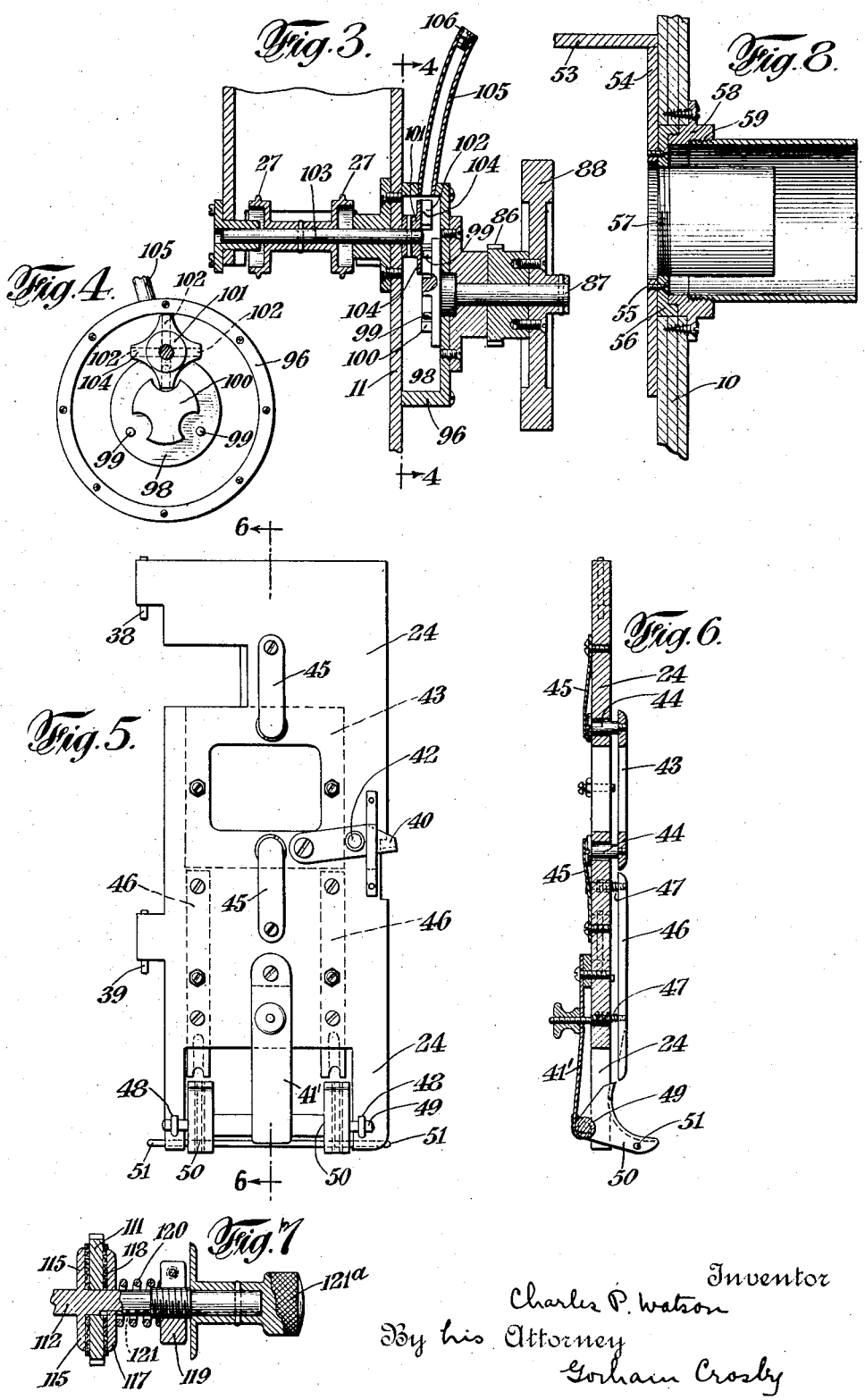

Patented Jan. 12, 1926.

1,569,103

UNITED STATES PATENT OFFICE.

CHARLES P. WATSON, OF NEW YORK, N. Y.

MOVING-PICTURE CAMERA.

Application filed May 13, 1920. Serial No. 381,175.

*To all whom it may concern:*

Be it known that I, CHARLES P. WATSON, citizen of the United States, and resident of the city of New York, in the county of New York and State of New York, have invented certain new and useful Improvements in Moving-Picture Cameras, of which the following is a specification.

My invention relates to moving picture cameras, and more particularly to cameras adapted to take consecutive exposures of moving objects at a high rate of speed, many times, 16 per second, whereby the positions therefrom may be projected at a much slower rate, as for example, about 16 per second and the motion of the object may be easily analyzed. I find that for the proper analysis of motion in this manner it is desirable that the exposures be made in the camera at the rate of about 150 per second or more. The main object of the invention is to provide a moving picture camera so constructed that it is capable of intermittently feeding a strip of negative film at this high rate of speed without undue wear or breakage of parts and in which the effects of vibration are reduced to a minimum. Further and more specific objects, features and advantages will more clearly appear from the detail description given below taken in connection with the accompanying drawings which form part of this specification. In the drawings Fig. 1 is a side view of the film moving parts in one side of a camera embodying my improvements in one form. Fig. 2 is a similar view of the gearing in the other side of the camera. Fig. 3 is a section taken on a line 3—3 of Fig. 2. Fig. 4 is a detail section taken on the line 4—4 of Fig. 3. Fig. 5 is a face view of the gate in front of which the negative film passes. Fig. 6 is a section taken on a line 6—6 of Fig. 5. Fig. 7 is a detail section of the frictional take-up device and Fig. 8 is a section through the lens holding parts.

Referring to Fig. 1, I there show a box 10 having vertical centrally disposed therein a metallic frame plate 11 by which most of the parts are carried. 13 represents in dotted lines a small case or box in which is suitably pivoted the unexposed roll of negative film 14, the film indicated at 15 being drawn therefrom and passing over an idler 16 and around under a positively driven sprocket 17 which engages the usual perforations along each side of the film in order to feed the film forward positively at a relatively uniform rate of speed. A pressure roller is shown at 18 for causing the film to properly track with the underneath side of the sprocket 17. The roller 18 is pivoted on an arm 19 which is pivoted on a pin 20, the arm 19 having a notch in one end engaged by a loop in a leaf spring 21 to hold the roller 18 in operative position. The arm 19, however, may be swung counter-clockwise as viewed in Fig. 1 against the action of spring 21 in order to move the roller 18 away from the sprocket 17 when the film is first threaded into the apparatus. A similar roller is shown at 21 causing the film to track with the upper portion of the sprocket 17 which roller 21 is secured to an arm 22 loosely pivoted on an arm 20 and likewise provided with a notch engaged by the loop of spring 21 for normally holding the arm 19 and roller 21 in operative position, but permitting the same to be swung clockwise to permit the film to be easily threaded about the sprocket 17. From the sprocket 17 the film 15 extends into a loose loop 23 and then down in front of the gate 24 in front of an exposure opening or window in the plate member 25 forming the rear part of a chamber of which a plate 26 forms the front side as viewed in Fig. 1. From in front of the bottom of the gate 24 the film passes around intermittently driven sprockets 27 and thence in the form of a loop 28 to the sprocket 29 which is constantly driven at a relatively uniform rate of speed. 30 represents an idler for causing the film to properly track with one side of the sprocket 29, the idler 30 being mounted on an arm 31 pivoted at 32 and held against a fixed stop 33 by spring 34. From the rear side of the sprocket 29, film passes around idler 35 and thence to the take-up reel 36 in a suitable box 37. The gate 24 is hinged to lugs on the frame plate 11 by means of pins 38 and 39 (see Fig. 5) and is provided with a latch 40 adapted to engage a catch 41 on the plate 25 to securely hold the gate in operative position. The latch is provided with a handle member 42 whereby the latch may be raised to unlatch the gate and swing it back from the plate 25 in order that the film may be easily threaded in front of the gate. The gate 24 is provided with pressure plate guide member 43 secured to one end of studs 44 passing loosely through the gate 24 and having their other ends engaged by leaf springs 45 which tend to press the pressure plate 43 toward the member 25 in order to hold the film flat thereagainst as it passes between the pressure member 43 and the plate 25. The gate 24 is also provided with two lower pressure guide members 46 for similarly pressing the film toward the plate 25 and for this purpose each member 46 is provided with pins projecting into the gate member 24 which pins are surrounded by spiral springs 47, one end of each of which bears against its member 46 and the other end of each of which bears against the bottom of a recess in the gate member 24. At its lower end the gate member 24 is provided with two hook members 48 in which rests a pivot rod 49 having rigidly secured thereto guides 50 adapted to be turned under so that their curved edges fit quite close to the sprockets 27 and cause the film to properly track thereon. In order to hold the guides 50 in this position, they are provided with a pin 51 adapted to slide over flat spring member 52 when the gate 24 is swung to and latched, the spring member 52 being rigidly secured to the frame work. A flat spring 41' tends to prevent the pivot rod 49 from coming out of the hooks 48.

The casing of which plates 25 and 26 form the rear end and front side respectively, is provided with a top metal plate member 53 and a front metal plate member 54 (see Fig. 8) and rigidly secured together and to the frame plate 11 by machine screws. Rigidly secured to the end of the front member 54 by machine screws 55 is a circular member 56 provided with screw threads at 57 whereby the usual lens may be screw-threaded thereto and thus secured by metal parts to the metallic frame 11. Also secured to the front of the camera is a circular member 58 provided with screw threads at 59 to which any suitable light shade may be secured for shading the lens.

For driving the apparatus, there is provided a rotatable spindle 60 (see Fig. 1) provided with a pin 61 adapted to engage any suitable form of handle member for rotating the spindle 60. Referring to Fig. 2 the spindle 60 or shaft 60 extends through and has a bearing in the metallic frame plate 11 and has secured thereto on the opposite side of the frame plate 11, gear 63 meshing with gear 64 on a shaft 65. The gear 64 meshes with a gear 68 on shaft 67 and the gear 68 meshes with gear 69 on a shaft 70. Shaft 70 extends through the frame plate 11 and on the opposite side thereof has rigidly secured thereto the continuous driven sprocket 17 so that in this manner the sprocket 17 is continuously driven at a substantially uniform rate of speed. The shaft 70 also carries a worm meshing with worm gear 71 secured on a shaft rotating in a frame member 73 which shaft has rigidly secured thereto a gear 74 meshing with the gear 75 secured on a shaft 76, which shaft extends to the rear end of the camera and is provided with a suitable indicator at 78 for indicating the number of feet of film reeled off, in a manner well understood by those skilled in the art. The shaft 67 also has rigidly secured thereto a gear 66 meshing with gear 79 on shaft 65. The gear 79 meshes with gear 80 on shaft 81. The shaft 81 also has rigidly secured thereto a gear 82 meshing with a gear 83 on shaft 84. Also rigidly secured to the shaft 84 is a gear 85 which meshes with gear 86 on shaft 87, to which is also rigidly secured a fly-wheel 88. The shaft 84 extends through the metal frame plate 11 and has secured on the opposite side thereof the constantly driven sprocket 29. Also meshing with the gear 82 is a gear 89 which in turn meshes with a gear 90 rigid on shaft 91. Also rigid on shaft 91 is bevel gear 92 meshing with a bevel gear 93 secured to a shaft 94 which carries and drives the rotary shutter 95 which may be of any suitable or well-known construction. Secured to the frame member 11 is an oil-tight casing 96 (see Figs. 3 and 4) into which the shaft 87 extends and has integral with the inner end thereof the pin member 98 of a Geneva movement. The pin member 98 is provided with three pins 99 and a solid locking center 100, adapted to engage the star member 101 of the Geneva movement which is provided with four slots 102 for engagement with the pins 99. The star member is pinned to a shaft 103 which extends through the frame plate 11 and has rigidly secured thereto on the opposite side of the frame plate 11 the intermittently driven sprockets 27.

I have found that in taking exposures at high speed such as for example, about 150 or more per second, that the ordinary form of Geneva movement will not properly withstand the strain, but by reinforcing the star member by making the back thereof solid and extending across the slots 102 as at 104, the star member if made of proper material is sufficiently reinforced so as to withstand the shocks given it when the apparatus is driven at such high speed. The wear and tear on each of the pins 99 is also decreased by providing three or a plurality thereof so that each one only receives one-third of the wear of the shocks, and the whole driving pin member 98 is made stronger and heavier so as to make a more even and uniform running at such high speed, by making the locking center 100 solid. At the top of the casing 96 I provide a tube 105 normally closed by screw plug 106 which may be removed and oil or other lubricant fed into the casing 96 to substantially fill the same so that the Geneva movement may run in the oil or other lubricant.

Referring to Fig. 2 the shaft 60 also has rigidly secured to it a large gear 107 meshing with a gear 108 rigid on shaft 109 which has rigidly secured thereto a large gear 110 meshing with a small gear 111 loose on a shaft 112 (see Fig. 7), which shaft extends through the frame plate 11 and on the other side thereof has rigidly secured to it an arm 113 provided with pins 114 for engagement with the take-up reel to drive the same. The shaft 112 is provided with an integral disc 115 and between the disc 115 and gear 111 is provided a friction disc or washer. Also mounted on the shaft 112 on the other side of the gear 111 is a washer 117 and between the washer 117 and the gear 111 is a friction washer 118. 119 represents a split nut adapted to be placed on the shaft 112 in any adjusted position in a manner well understood by those skilled in the art, and between the nut 119 and the washer 117 is arranged a spiral spring 120, which spring is under compression in order to force the washers 117 and 118 toward the gear 111. The washer 117 is provided with a part projecting into a key slot 121 in the shaft 112, so that when the gear 111 is turned it will frictionally engage the washers 116 and 118 which in turn frictionally engage the disc and washer 115 and 177 which will drive the shaft 112. By thus driving the shaft 112 with this frictional connection the take-up reel will only be driven as fast as film is supplied thereto for taking up although the gear 111 will be driven at a slightly greater speed. By this arrangement a positive take-up of the film is obtained at the high rate of speed at which the apparatus is driven. On the end of the shaft 111 is provided a thumb piece 121ª which may be used to turn the shaft 112 and the take-up reel and the various gears in order to move them slowly when the film is being threaded through the apparatus.

In order that vibrations due to the rapidity with which the apparatus is driven may not affect the pictures, I rigidly secure to the frame plate 11 as by screw 122 (see Figs. 1 and 2) and pins 123, a stud 124, which stud is enlarged at the bottom and extends part way through the bottom wooden boards of the box structure 10. Screw-threaded into the bottom of this metallic stud 124 and firmly secured thereto is a brass member 125 provided with an internal screw-threaded bore 126 into which is adapted to be screw-threaded, the screw-threaded metallic pin on the top of the usual tripod or other supporting structure employed for supporting the camera. It will thus be seen that the top of the tripod or standard will be rigidly secured by metal connecting parts to the metallic frame plate 11 whereby the effect of vibrations on the pictures is substantially eliminated or materially reduced. That is, by thus providing means whereby the tripod or supporting structure is secured firmly to the frame plate 11 by metal connecting parts the disadvantageous effects due to vibrations of the camera as a whole with respect to the objects being photographed, will be materially reduced or eliminated even though the film be intermittently fed at very high speed. This is especially important since the high speed at which the parts are driven tends to accentuate or increase the effect of such vibrations. A large metal plate 140 is also secured to the bottom of the camera which tends to increase its steadiness. Also by connecting or securing the lens structure firmly to the frame plate 11 through the metal connecting parts 56, 54, etc., the lens is held firmly to the film supporting parts at the point of exposure whereby vibrations of the lens with respect to the film at the point of exposure is substantially reduced or eliminated. The gearing is such that upon giving the shaft or spindle 60 one revolution, the shaft 87 carrying the pin member of the Geneva movement will be given about fifty or more revolutions whereby for each revolution of the driving spindle 60, the sprockets 27 will be given about 150 or more intermittent movements.

125′ represents a shaft pivoted in the front of the camera and having one end extending through the front of the camera to which end is secured a handle lever member 126′. At the other end there is secured to the shaft 125′ an arm 127 pivoted to a vertical member 129 which at its lower end carries a prism for use in focusing the camera. By throwing the handle 127 down the prism is lowered to a position opposite the focusing window 128 in which position it intercepts the light rays through the lens in a manner well understood by those skilled in the art. Upon swinging the handle member 126′ in the opposite direction the prism is raised to a position where it is out of the path of the light passing through the lens so that it will not interfere with the exposure of the film.

In order to decrease the generation of heat when the film is intermittently fed at the high rate of speed in the manner described, I coat the perforate edges of the film which engage the driving sprockets, with one or more coats of paraffine which act as a lubricant therefor. It will be understood that the wooden box structure 10 is provided with suitable doors, one hinged on one side by hinges at 130 (see Fig. 1) and the other hinged on the other side by hinges at 131 (see Fig. 2) whereby when the doors are locked closed, light is excluded from the interior and a dark chamber is provided for the negative film strip. It will further be understood that the shutter 95 is constantly driven to cut off the light through the exposure opening behind the lens when the film is moving past the same and permitting light to pass through the exposure opening to expose the film when it is at rest before the opening in a manner well understood by those skilled in the art. I find that by constructing the Geneva movement as shown in Figs. 3 and 4 with the slotted portions of the driven member integrally connected along one side and the locking means of the driving center substantially solid, that these parts are capable of withstanding for a considerable period of time the shocks due to driving the apparatus at a speed such that the driving member is given 150 or more movements per second. It will be understood that the other co-operating parts are constructed so as to be capable of likewise withstanding the shocks due to this high speed at which the parts are driven. The wear and heat due to friction is materially decreased by enclosing the Geneva movement in the casing 96 containing a lubricant in which the movement runs. I preferably construct guide and bearing members 43 and 46 of wood as I find that when so constructed they are less likely to cause friction and heating difficulties.

While I have described my improvements in great detail and with respect to one form thereof, I do not desire to be limited to such details and form since many changes may be made and the invention embodied in widely different forms without departing from the spirit and scope thereof in its broader aspects.

What I claim as new and desire to secure by Letters Patent is:

1. A high speed moving picture camera having a metal framework, mechanical means secured to and carried by said framework for intermittently feeding a negative film to be exposed, a light excluding box structure substantially surrounding said framework and mechanical means and containing dark space for the film reels, a lens structure through which the film is exposed, means whereby the lens structure is firmly secured to said frame work by metal connecting parts, a shutter cooperating to cut off the light through the lens when the film is moving between exposures, means for driving the mechanism at a speed to cause the film to be exposed at the rate of about 150 or more consecutive exposures per second and means whereby a supporting standard may be secured firmly to said frame work by metal connecting parts.

2. A high speed moving picture camera having a metal supporting part adapted to be directly connected to a supporting standard, a light-excluding box structure carried by said metal supporting part, a metallic lens-holding structure firmly secured to said metal supporting part by metallic connecting parts, means in said box structure for intermittently feeding a film past said lens structure, and a metallic frame in said box structure for holding the film in operative position with respect to the lens and means firmly securing said frame to said metal supporting part and lens structure by metallic connecting parts, whereby any substantial relative vibration between the lens structure, film gate and standard is prevented when the film is driven at a speed of substantially more than 150 intermittent movements per second.

3. A high speed moving picture camera having a metal supporting part adapted to be directly connected to a supporting standard, a light-excluding box structure carried by said metal supporting part, a lens-holding structure firmly secured to said metal supporting part by metallic connecting parts, means in said box structure for intermittently feeding a film past said lens structure, and a metallic frame in said box structure for holding the film in operative position with respect to the lens, whereby any substantial relative vibration between the lens structure and standard is prevented when the film is fed at a speed of substantially more than 150 intermittent movements per second.

4. A high speed moving picture camera having a light enclosing box structure having a metal supporting part adapted to be directly connected to a supporting standard, a metallic frame part in said box structure secured to said metallic supporting part by metallic connecting parts, a lens structure secured to said frame part by metal connecting parts, means in said box structure for supporting a film in operative position with respect to the lens structure, and feeding mechanism carried by said frame part for intermittently moving the film past the lens structure, whereby any substantial vibration between the lens structure, film supporting structure and standard is prevented when the film is driven at a speed of 150 intermittent movements per second.

5. A high speed moving picture camera having a light enclosing box structure having a metal supporting part adapted to be directly connected to a supporting standard, a vertically arranged metal frame plate in said box structure and secured to said metal supporting part by metal connecting parts, a vertical metal frame plate in said box structure and extending at substantially a right angle to said aforementioned frame plate and secured thereto by metal connecting parts, a metallic lens holding structure secured to said last mentioned plate by metallic connecting parts, metallic means in the box structure for supporting a film in operative position with respect to the lens structure, said means being rigidly connected with the first mentioned frame plate, and feeding mechanism carried by said first mentioned frame plate for intermittently moving the film past the lens structure, whereby any substantial vibration between the lens structure and standard is prevented when the film is driven at a speed of 150 intermittent movements per second.

6. A high speed moving picture camera having a light excluding box with a metallic stud extending therethrough adapted to be directly connected to a supporting standard, a metallic frame plate directly screwed to said stud, a metallic lens holding structure secured to said frame plate by metallic connecting parts, means in said box structure for supporting a film strip in operative position with respect to the lens structure, and feeding mechanism carried by said frame plate for intermittently moving the film past the lens structure, whereby any substantial vibration between the lens structure and standard is prevented when the film is driven at a speed of 150 intermittent movements per second.

7. A high speed moving picture camera having a light inclosing box structure with metal supporting framework, mechanical means in said box structure and carried by said framework for intermittently feeding a negative film to be exposed, said means including a Geneva movement having a driven member with slotted portions, the sides of each of which are integrally connected respectively and a driving member with a plurality of driving pins and a substantially solid locking center, a lens structure through which the film is exposed, means whereby the lens structure is firmly secured to said frame work by metal connecting parts, a shutter cooperating to cut off light through the lens when the film is moving between exposures and means for driving the mechanism at a speed to cause the film to be exposed at the rate of about 150 or more consecutive exposures per second.

8. A high speed moving picture camera having a light inclosing box structure with metal supporting framework and space for reels of undeveloped negative film, mechanical means in said box structure and carried by said framework for intermittently feeding a negative film to be exposed, said means including a Geneva movement having a driven member with slotted portions, the sides of each of which are integrally connected respectively and a driving member with a plurality of driving pins and a substantially solid locking center, a lens structure through which the film is exposed, means whereby the lens structure is firmly secured to said framework, a shutter cooperating to cut off light through the lens when the film is moving between exposures and means for driving the mechanism at a speed to cause the film to be exposed at the rate of about 150 or more consecutive exposures per second.

Signed at New York city, in the county of New York and State of New York, this 11th day of May, A. D. 1920.

CHARLES P. WATSON.